US010362454B2

(12) United States Patent
Oleksiak et al.

(10) Patent No.: US 10,362,454 B2
(45) Date of Patent: Jul. 23, 2019

(54) CELLULAR RESTAURANT TICKET PRINTER SYSTEM

(71) Applicants: Gregory Oleksiak, Charleston, SC (US); Anthony Stewart Moore, Charleston, SC (US)

(72) Inventors: Gregory Oleksiak, Charleston, SC (US); Anthony Stewart Moore, Charleston, SC (US)

(*) Notice: Subject to any disclaimer, the term of this patent is extended or adjusted under 35 U.S.C. 154(b) by 246 days.

(21) Appl. No.: 14/615,391

(22) Filed: Feb. 5, 2015

(65) Prior Publication Data

US 2015/0220816 A1 Aug. 6, 2015

Related U.S. Application Data

(60) Provisional application No. 61/935,936, filed on Feb. 5, 2014.

(51) Int. Cl.
*H04W 4/12* (2009.01)
*G06Q 50/12* (2012.01)

(52) U.S. Cl.
CPC ............. *H04W 4/12* (2013.01); *G06Q 50/12* (2013.01)

(58) Field of Classification Search
USPC .......................................................... 705/15
See application file for complete search history.

(56) References Cited

U.S. PATENT DOCUMENTS

| 7,957,014 B2* | 6/2011 | Biundo | H04N 1/00132 358/1.15 |
| 2007/0173266 A1* | 7/2007 | Barnes, Jr. | G06Q 10/1053 455/456.1 |

* cited by examiner

*Primary Examiner* — Garcia Ade
(74) *Attorney, Agent, or Firm* — Gregory Finch; Finch Paolino, LLC

(57) ABSTRACT

A thermal ticket printer operable to receive restaurant orders via an API from a server communicating through a cellular network. According to embodiments of the present disclosure, an API existing on a networked server enables the server communicate with external clients, store print jobs according to requests by external clients, and respond to status requests. The API may authenticate requests from all clients; receive and store orders; listen to polling requests from the thermal ticket printer; communicate orders to the thermal ticket printer when present; store status of print jobs for clients; and, monitor the availability of the thermal ticket printer.

10 Claims, 3 Drawing Sheets

CELLULAR RESTAURANT TICKET PRINTER SYSTEM

RELATED APPLICATIONS

This application claims the benefit of U.S. Provisional Application 61/935,936, titled CELLULAR TICKET PRINTER SYSTEM; filed Feb. 5, 2014, hereby incorporated by reference.

FIELD

The present invention relates to the field of wireless printer systems, in particular, a printer that communicates to an application programming interface (API) via a cellular network to receive and execute print jobs in the form of data from clients.

BACKGROUND

In today's printing environment, to make a printer's functionality available to a number of different people, the printer is often incorporated into a computing network using various hard line network connections. For example, a printer in a business environment, such as an office, typically has a network port with a cable physically connected to it. The cable typically runs to or accesses a network server. Each person who desires to print on such a printer from their desktop computer typically accesses the printer via a network cable that runs from their computer to a network connection that accesses the network server.

In the restaurant industry, ticket printers are often used with point of sale (POS) systems to communicate food orders from the service staff to the kitchen staff. When a food order is inputted into the POS by the server, the order details are communicated to the ticket printer via a wireless or wireline network connection and printed by the printer.

In the restaurant industry, many restaurants receive orders from customers outside the restaurant for pick-up or delivery. These orders are received by a variety of means, including on-line orders via the restaurant's website; phone orders made by the customer directly to the restaurant; or third-party services that receive orders from the customer and relay the orders to the restaurant. In regards to third-party services, the method of communicating customer orders requires personnel from the restaurant to receive the orders via phone or e-mail. Outside orders must be manually inputted into the restaurant's POS system, unless the restaurant has a fully integrated POS system, which is cost prohibitive for most small restaurants.

What is needed, therefore, is an apparatus and system that enables a restaurant to receive a food order from a customer via email or text message, and directly print the order in the restaurant without the need for manual input into a POS system.

SUMMARY

An object of the present invention is a thermal printer which communicates to an API via a cellular network. The API may accept print jobs in the form of data from clients, store it and make it available to the printer. The printer may communicate the status of the print job to the API, which in turn may communicate status to external clients.

Another object of the present disclosure is a system comprising a printing device configured to print a restaurant order ticket; at least one processor associated with the printing device; at least one communications interface operably engaged with the at least one processor, the at least one communications interface operable to receive a restaurant order; one or more computer-readable media operably engaged with the at least one processor; computer-readable instructions stored on the one or more computer-readable that, when executed by the at least one processor, cause the at least one communications interface to make an order request to a cellular network, and instruct the printing device to print a restaurant order ticket; a cellular phone configured to communicate a text message containing restaurant order over a cellular network; a server communicably connected to a cellular network, the server operable to receive and store the restaurant order from the cellular phone, and communicate the restaurant order to the printing device in response to the order request.

Still another object of the present disclosure is a restaurant ticket printer comprising a communications interface; a computer-readable medium storing instructions for operating the restaurant ticket printer including communicating with a server through the communications interface to receive, format and print restaurant orders received from the server via the communications interface; a processor for executing instructions stored on the computer-readable medium; an input device configured to input a wait-time value; and, a print unit operably coupled to the processor.

Yet another object of the present disclosure is a restaurant ticket system comprising a server operably connected to a communications network, the server operable to execute an API that enables the server to receive and transmit restaurant orders via the communications network; a printing device having a communications interface communicably engaged with the server via the communications network; a computer-readable medium associated with the printing device, the computer-readable medium storing instructions for operating the printing device including communicating with the server through the communications interface to receive, format and print restaurant orders received from the server via the communications interface; a processor associated with the printing device for executing instructions stored on the computer-readable medium; an input device associated with the printing device configured to input a wait-time value; and, a print unit associated with the printing device operably coupled to the processor; a client device operable to communicate a restaurant order to the server via the communications network.

Further embodiments, features, and advantages of the invention, as well as the structure and operation of the various embodiments of the invention are described in detail below with reference to the accompanying drawings.

BRIEF DESCRIPTION OF DRAWINGS

Referring to the figures, wherein like numerals represent like parts throughout the several views.

DETAILED DESCRIPTION

Reference will now be made in detail to various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, protocols, services, components, and circuits have not been described in detail so as not to unnecessarily obscure aspects of the present invention.

Figure 1:
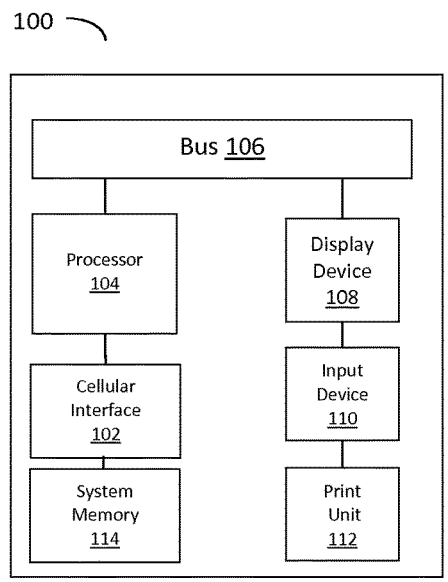
FIG. 1 is a block diagram of a typical computer system into which one implementation of the present invention may be incorporated.

According to an embodiment of the present disclosure, FIG. 1 is a functional block diagram generally illustrating a printing device 100, one or more of which may be adapted for use in the illustrative system for implementing the invention. The printing device may be, for example, a printer system networked with a personal computer, a handheld device such as a cell phone or tablet computer, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

In a preferred embodiment, printing device 100 is generally comprised of cellular interface 102, a processor 104, a system bus 106, at least one display device 108, at least one input device 110, a printer unit 112, and system memory 114. Cellular interface 102 can be any off-the-shelf hardware operable to communicate messages via a cellular network. This can include 2G, 3G and 4G chips that enable communication via a wireless Internet network or cellular network. Cellular interface 102 may be replaced by wireless Internet interface; wireless internet interface may be in addition to a cellular interface. Depending on the configuration and type of printing device 100, system memory 114 may be volatile (such as RAM), non-volatile (such as ROM, flash memory, etc.), or some combination of the two. System memory 114 should be a computer-readable medium capable of storing instructions for operating the printer including communicating with an API through cellular interface 102 to receive, format, and print resources received directly from the API via cellular interface 102. Processor 104 processes various instructions necessary to operate printing device 100 and communicate with a cellular network. System bus 106 can communicate instructions from processor 104 to display device 108, input device 110, and a print unit 112. Display device 108 can be an LCD screen that enables a user to see messages such as pending orders, system status and system settings. In an embodiment, input device 110 is a knob, or knobs, that enable a user to select "Pickup Time" and "Delivery Time" values into printing device 100. Input device 110 can also include a print button. The print button communicates a print request to printed circuit board 104 via system bus 106, and the printed circuit board 104 in turn communicates any pending print jobs to printer device 106. In an embodiment, print unit 112 is a thermal printer. A thermal printer is a device for thermal printing. Thermal printing (or direct thermal printing) is a digital printing process which produces a printed image by selectively heating coated thermochromic paper, or thermal paper, when the paper passes over the thermal print head. The coating turns black in the areas where it is heated, producing an image. Printer 100 may also include a subscriber identity module, or SIM card, for unique identification of each printer in a distributed network such that an API executing over a networked server may correctly communicate intended messages to each printer device 100.

Figure 2:
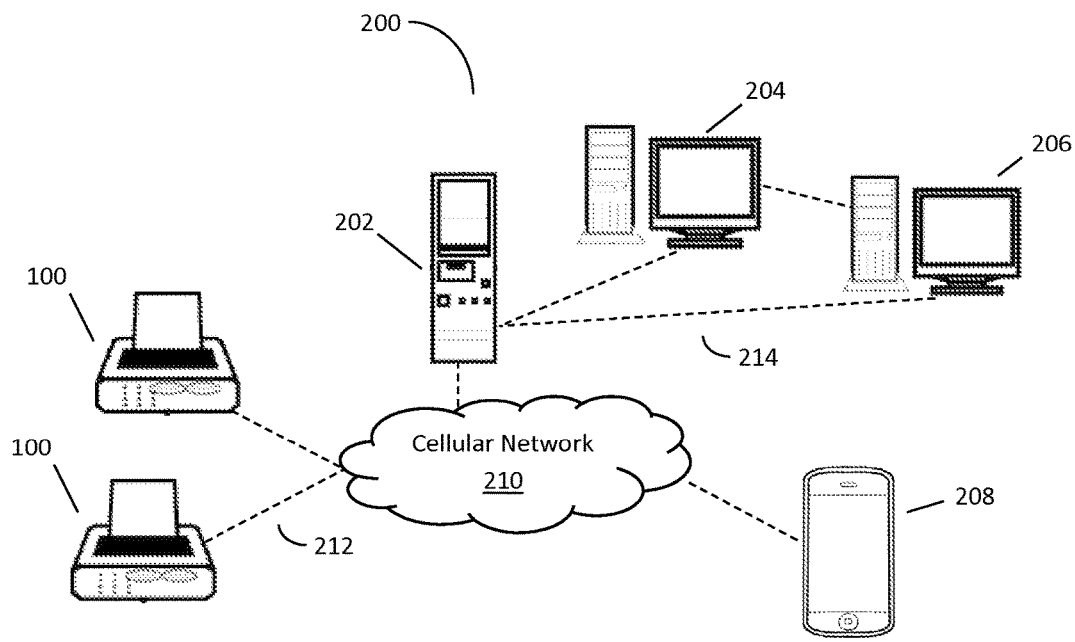
FIG. 2 is a block diagram of a typical system into which one implementation of the present invention may be incorporated.

According to an embodiment of the present disclosure, FIG. 2 is a block diagram of a typical system into which one implementation of the present invention may be incorporated. In an exemplary embodiment, system 200 enables electronic transmission of a restaurant order from a client machine 204 to an application programming interface (API) executing on a networked server 202 that transmits the order over a dedicated cellular connection to a printing device 100, which confirms receipt of the order. The API defines the specifications for routines, data structures, object classes, and variables to enable networked server 202 to receive orders from an external client, and communicate instructions the appropriate printing device 100. In an embodiment, the API 202 receives and stores orders from external clients. External clients can include a customer machine 204, a third-party machine 206, and/or a cell phone 208.

In an exemplary embodiment, printing device 100 is located in a restaurant. Customer machine 204 is associated with a restaurant customer placing an order to the restaurant via a Web application. The order is communicated through an internet connection 214 to server 202 and communicated to printing device 100 through cellular network 210. A restaurant customer may also place an order to a restaurant indirectly via a third-party machine 206. In this scenario, the customer may place an order via a third-party Web application that communicates the order to third-party machine 206 via Internet connection 210. Third-party machine 206 communicates the order to printing machine 100 in the same manner as customer machine 204 described above. An order may also be communicated to printing machine 100 via cell phone 208. A user may text message an order to server 202 via cellular network 210. Server 202 then communicates the order to printing machine 100 via cellular network 210.

Figure 3:
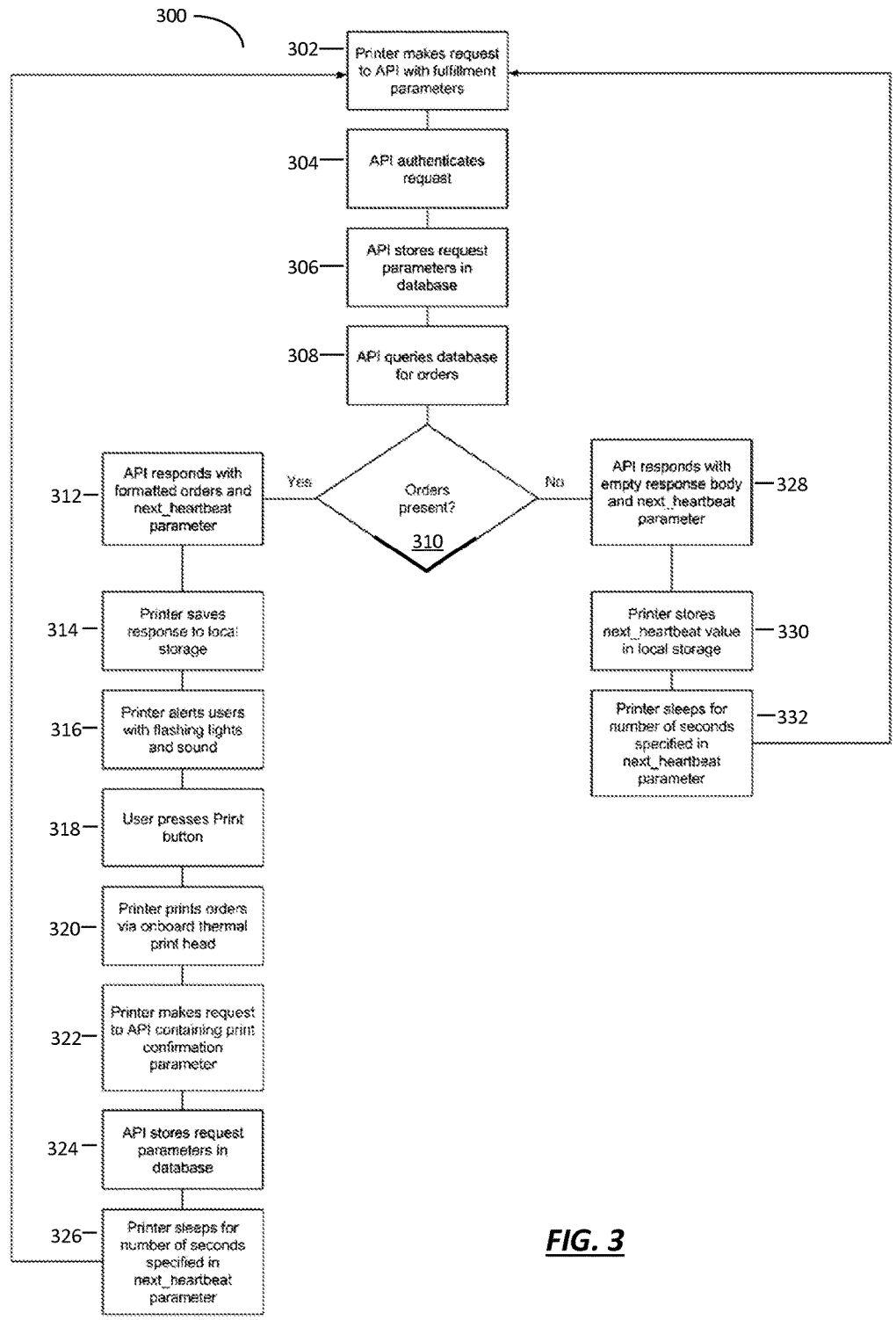
FIG. 3 is a schematic block diagram showing the logic flow of a system for receiving and printing sales transactions; and, FIG. 4 is a schematic block diagram of a routine executed during the logic flow of a system for receiving and printing sales transactions.

According to an embodiment of the present disclosure, FIG. 3 is a schematic block diagram showing the logic flow of a system for receiving and printing sales transactions. In an embodiment, an online order taker electronically transmits an order to a server executing an API that transmits the order over a dedicated cellular connection to a ticket printer which confirms receipt of the order. The API receives and stores orders from external clients. The orders are categorized for delivery to the correct printer. The API presents orders to the corresponding printer when requested. The API receives status updates from the printer related to print job status. The printer polls the API on regular intervals, requesting orders. If the API has an order queued for delivery to that printer, it is presented as a response to the printer's poll request. The system software or API is operable to authenticate requests from all clients; receives orders from external clients; store the order; listen for polling requests from printers; present printers with orders when present; store status of print jobs for clients; and, monitor the availability of printers.

According to a system 300, a printer makes a request to an API with fulfillment parameters 302. The request may be communicated through a cellular network to the API executing on a networked server, as described in FIG. 2. The API may authenticate the request 304 and store the request parameters in a database 306. According to predetermined intervals, the API queries the database for orders 308 to determine if orders are present 310. If orders are not present, the API responds with empty response body and "next_heartbeat" parameter 328. A "heartbeat" parameter is a predetermined interval upon which the printer communicates an inquiry to the API. The printer stores the heartbeat value in local storage 330 and remains dormant for the time specified in the heartbeat parameter 332 before making another request to the API with fulfillment parameters 302.

If orders are present in the orders database 310, the API responds to the printer with formatted orders and a next_heartbeat parameter 312. The printer then saves the response to local storage 314 and alerts users with flashing lights and/or sound(s) 316. A user then presses or selects a "print" button or prompts on the printer 318, and the printer prints orders via an onboard thermal print head 320. The printer then makes a request to the API containing the print confirmation parameter(s) 322 and stores the request parameter (s) in the database 324. The API may communicate a confirmation message to an external client. Upon completion of a print job, the printer "sleeps" for a period of time specified in the heartbeat parameter 326 before making another request to the API with fulfillment parameters 302.

Figure 4:
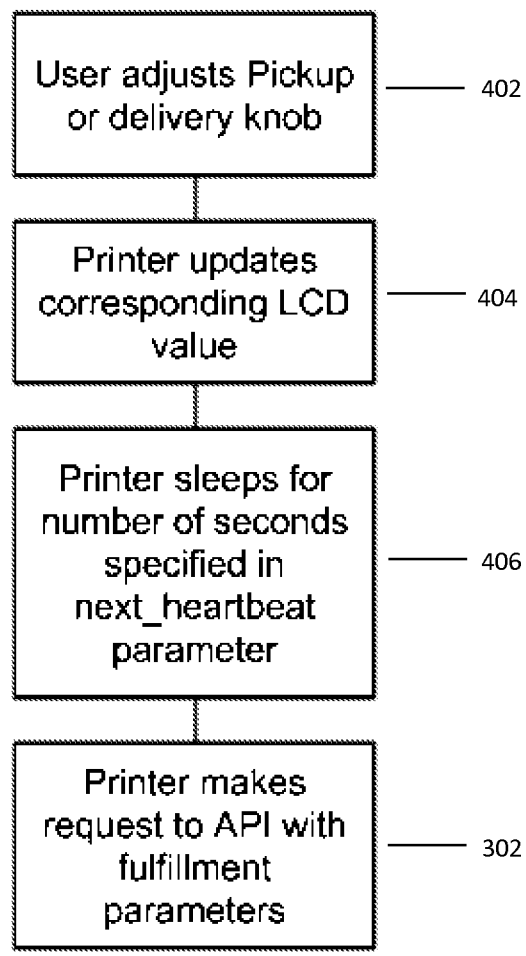

According to an embodiment of the present disclosure, FIG. 4 is a schematic block diagram of a routine executed during the logic flow of a system for receiving and printing sales transactions. In an embodiment, the printer can communicate estimated pick-up and delivery wait-times to an API executing on a networked server, which can then communicate the wait time value to an external client. A user can adjust a pick-up or delivery input knob 402 to correspond with a desired wait-time value on the printer device. The printer can update wait-time value(s) in system memory and display values on a display device 404, such as an LCD screen. The printer may then sleep for a predetermined number of seconds according to the heartbeat parameter 406 before making a request to the API with fulfillment parameter 302.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A restaurant ticket printer system comprising:
a networked printing apparatus being located in a restaurant, the networked printing apparatus being operably engaged with a networked server via a wireless communications network to communicate a fulfillment request pursuant to a specified heartbeat parameter to an application programming interface executing on the networked server, the application programming interface being configured to authenticate the fulfillment request and communicate a fulfillment response comprising a next heartbeat parameter to the networked printing apparatus, the networked printing apparatus comprising:
a communications interface comprising a cellular communications chipset and a subscriber identity module, the subscriber identity module corresponding to a predetermined restaurant location such that each restaurant order in the plurality of restaurant orders may be authenticated by the networked server and communicated to the networked printing apparatus;
a processor being operably engaged with the communications interface and a memory device, the memory device being configured to store one or more instructions to be executed by the processor, the one or more instructions comprising: instructions for communicating an order request to the networked server via the communications interface, instructions for receiving an authenticated order from the networked server via the communications interface, and instructions for processing an authenticated order;
an input device being operably engaged with the processor, the input device being operable to communicate pick-up time and delivery time values to the processor corresponding to each restaurant order in the plurality of restaurant orders; and,
a print unit operably coupled to the processor, the print unit being operable to print each restaurant order in the plurality of restaurant orders in response to a print instruction by the processor.

2. The restaurant ticket printer system of claim 1 wherein the one or more instructions to be executed by the processor further comprise instructions for communicating an order confirmation and a pick-up or delivery time value to the networked server.

3. The restaurant ticket printer system of claim 1 wherein the application programming interface is configured to receive a plurality of order requests from a plurality of external client devices, and categorize each order request in the plurality of order requests according to the subscriber identity module of the networked printing apparatus.

4. A restaurant ticket system comprising:
a networked server operably connected to a communications network, the networked server being operable to receive a plurality of restaurant orders from a plurality of external client devices via an application programming interface executing on the networked server, the application programming interface being configured to associate each restaurant order in the plurality of restaurant orders with a subscriber identity value, and queue each restaurant order in the plurality of restaurant orders for delivery according to the subscriber identity value and a heartbeat parameter;
at least one networked printing apparatus being located in a restaurant, the at least one networked printing apparatus being operably engaged with the networked server via the communications network to communicate a fulfillment request pursuant to a specified heartbeat parameter to the application programming interface executing on the networked server, the application programming interface being configured to authenticate the fulfillment request according to the subscriber identity value and communicate a fulfillment response comprising a next heartbeat parameter to the networked printing apparatus, the networked printing apparatus comprising:
a communications interface comprising a cellular communications chipset and a subscriber identity module, the subscriber identity module corresponding to a predetermined restaurant location such that each restaurant order in the plurality of restaurant orders may be authenticated by the networked server and communicated to the networked printing apparatus;

a processor being operably engaged with the communications interface and a memory device, the memory device being configured to store one or more instructions to be executed by the processor, the one or more instructions comprising: instructions for communicating a polling request to the networked server via the communications interface, instructions for receiving an authenticated order from the networked server via the communications interface, and instructions for processing an authenticated order;

an input device being operably engaged with the processor, the input device being operable to communicate pick-up time and delivery time values to the processor corresponding to each restaurant order in the plurality of restaurant orders; and, a print unit operably coupled to the processor, the print unit being operable to print each restaurant order in the plurality of restaurant orders in response to a print instruction by the processor.

5. The restaurant ticket system of claim 4 wherein the application programming interface is configured to communicate an empty response body and the next heartbeat parameter to the at least one networked printing apparatus in response to the fulfillment request if no orders are queued for delivery.

6. The restaurant ticket system of claim 4 wherein the communications network comprises a dedicated cellular connection associated with the subscriber identity module of the at least one networked printing apparatus.

7. The restaurant ticket system of claim 4 wherein the plurality of external client devices are operable to communicate the plurality of restaurant orders to the networked server via a Short Message Service.

8. The restaurant ticket system of claim 4 wherein the application programming interface is configured to communicate a formatted order and the next heartbeat parameter to the at least one networked printing apparatus in response to the fulfillment request if one or more orders are queued for delivery.

9. The restaurant ticket system of claim 4 wherein the application programming interface is configured to store request parameters in a non-transitory computer-readable medium on the networked server according to the subscriber identity value.

10. The restaurant ticket system of claim 8 wherein the application programming interface is configured to communicate an order confirmation message and wait time value to an external client device in the plurality of external client devices in response to communicating the formatted order and the next heartbeat parameter to the at least one networked printing apparatus.

* * * * *